(12) United States Patent
Bishop et al.

(10) Patent No.: US 12,211,278 B2
(45) Date of Patent: Jan. 28, 2025

(54) DEEP LEARNING BASED VIDEO INFORMATION EXTRACTION SYSTEM

(71) Applicant: GOVERNMENT OF THE UNITED STATES AS REPRESENTED BY THE SECRETARY OF THE AIR FORCE, Rome, NY (US)

(72) Inventors: Morgan A. Bishop, Whitesboro, NY (US); James M. Nagy, Sylvan Beach, NY (US); William M. Pottenger, Hellertown, PA (US); Anthony Hoogs, Niskayuna, NY (US); Tuanjie Tong, Allentown, PA (US)

(73) Assignee: United States of America as represented by the Secretary of the Air Force, Rome, NY (US)

( * ) Notice: Subject to any disclaimer, the term of this patent is extended or adjusted under 35 U.S.C. 154(b) by 441 days.

(21) Appl. No.: 17/742,781

(22) Filed: May 12, 2022

(65) Prior Publication Data

US 2023/0368532 A1 Nov. 16, 2023

(51) Int. Cl.
*G06V 20/40* (2022.01)
*G06F 40/10* (2020.01)
*G06F 40/289* (2020.01)
*G06V 10/82* (2022.01)

(52) U.S. Cl.
CPC .............. *G06V 20/46* (2022.01); *G06F 40/10* (2020.01); *G06F 40/289* (2020.01); *G06V 10/82* (2022.01)

(58) Field of Classification Search
None
See application file for complete search history.

(56) References Cited

U.S. PATENT DOCUMENTS

| 8,572,071 | B2 | 10/2013 | Pottenger et al. | |
| 2021/0124741 | A1* | 4/2021 | Acharya | G06Q 50/26 |
| 2022/0129699 | A1* | 4/2022 | Noroozi | G06N 3/088 |

FOREIGN PATENT DOCUMENTS

WO WO-2021092631 A2 * 5/2021 ............. G06F 16/78

* cited by examiner

Primary Examiner — Lennin R Rodriguezgonzalez
(74) Attorney, Agent, or Firm — AFRL/RI; Roddy M. Bullock

(57) ABSTRACT

A video information extraction system includes a memory to store a video; a textual information extraction module to obtain information about terms, entities, relations, and events from a ground truth caption corresponding to the video; and a video captioning module including an encoder (i) to receive the information about the terms, entities, relations, and events from the textual information extraction module, and (ii) to extract video features from the video; and a decoder to generate a text caption based on the extracted video features.

20 Claims, 19 Drawing Sheets

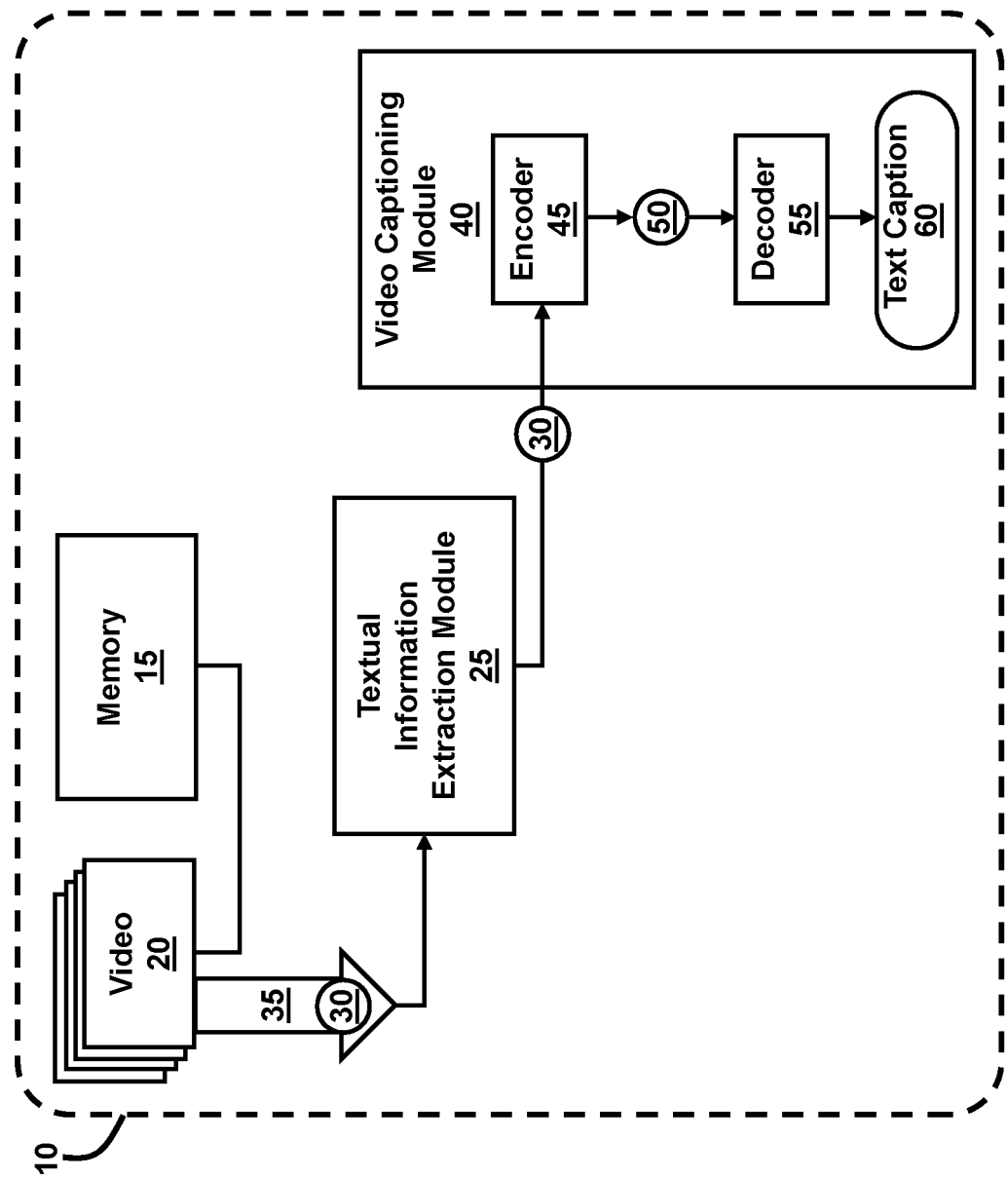

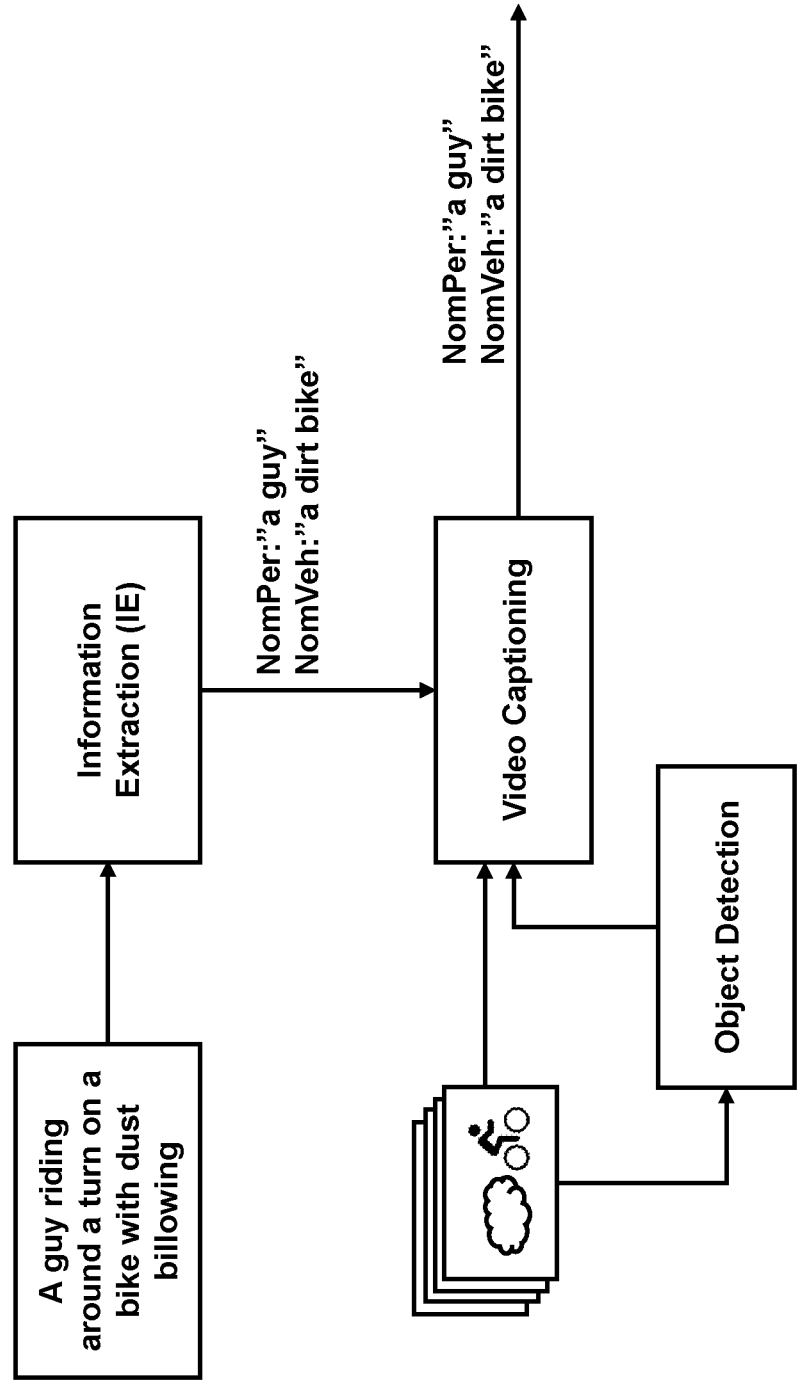

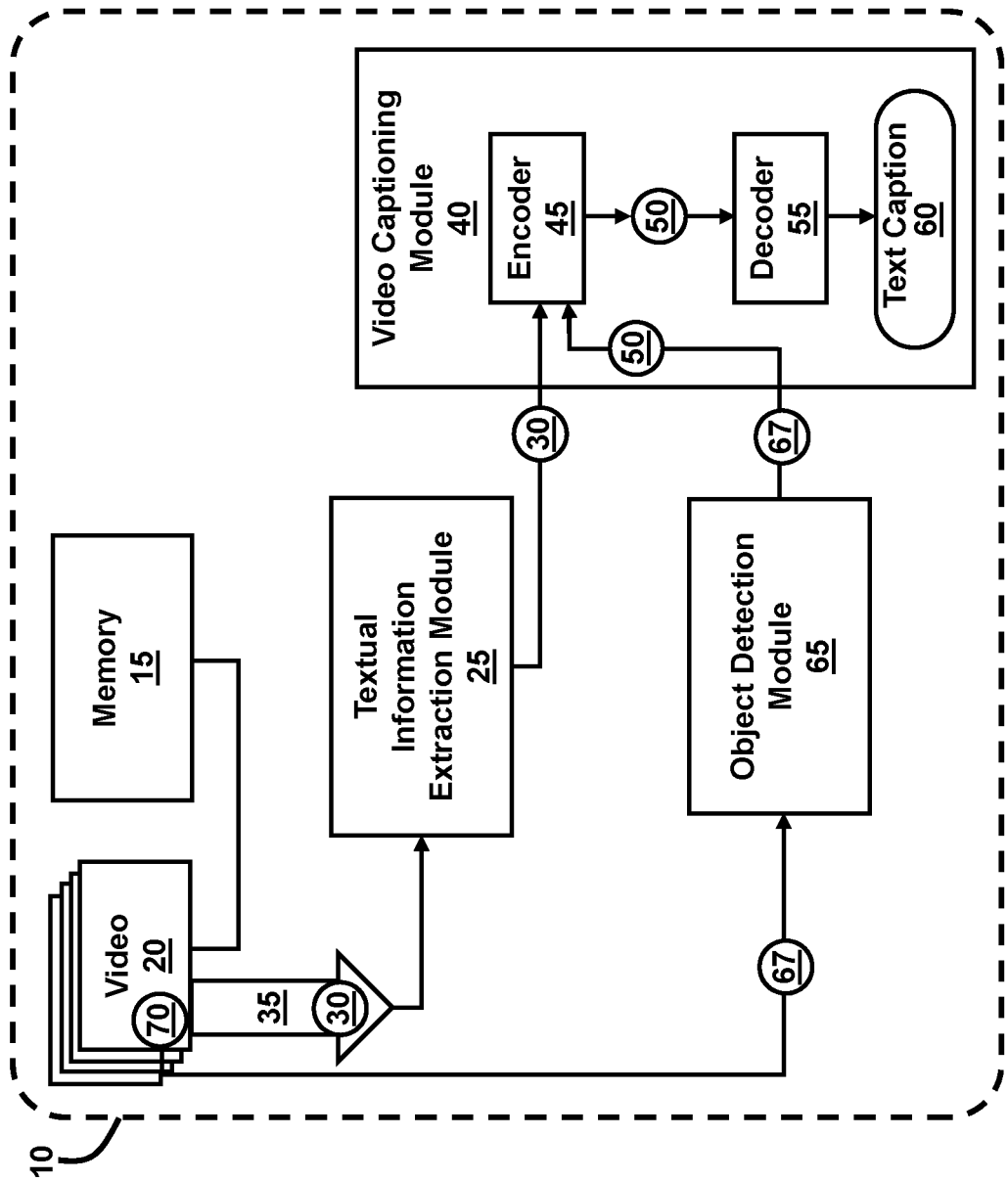

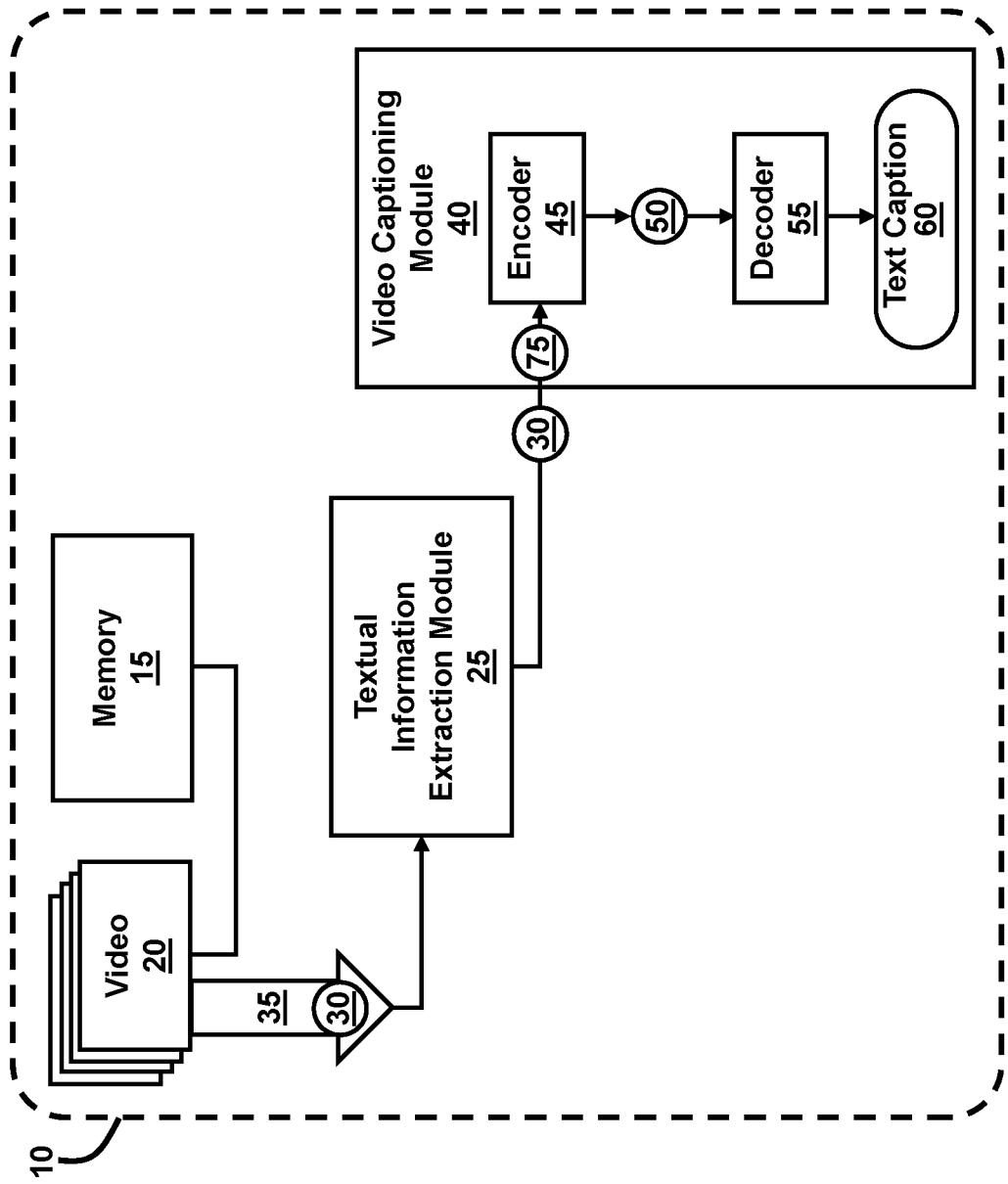

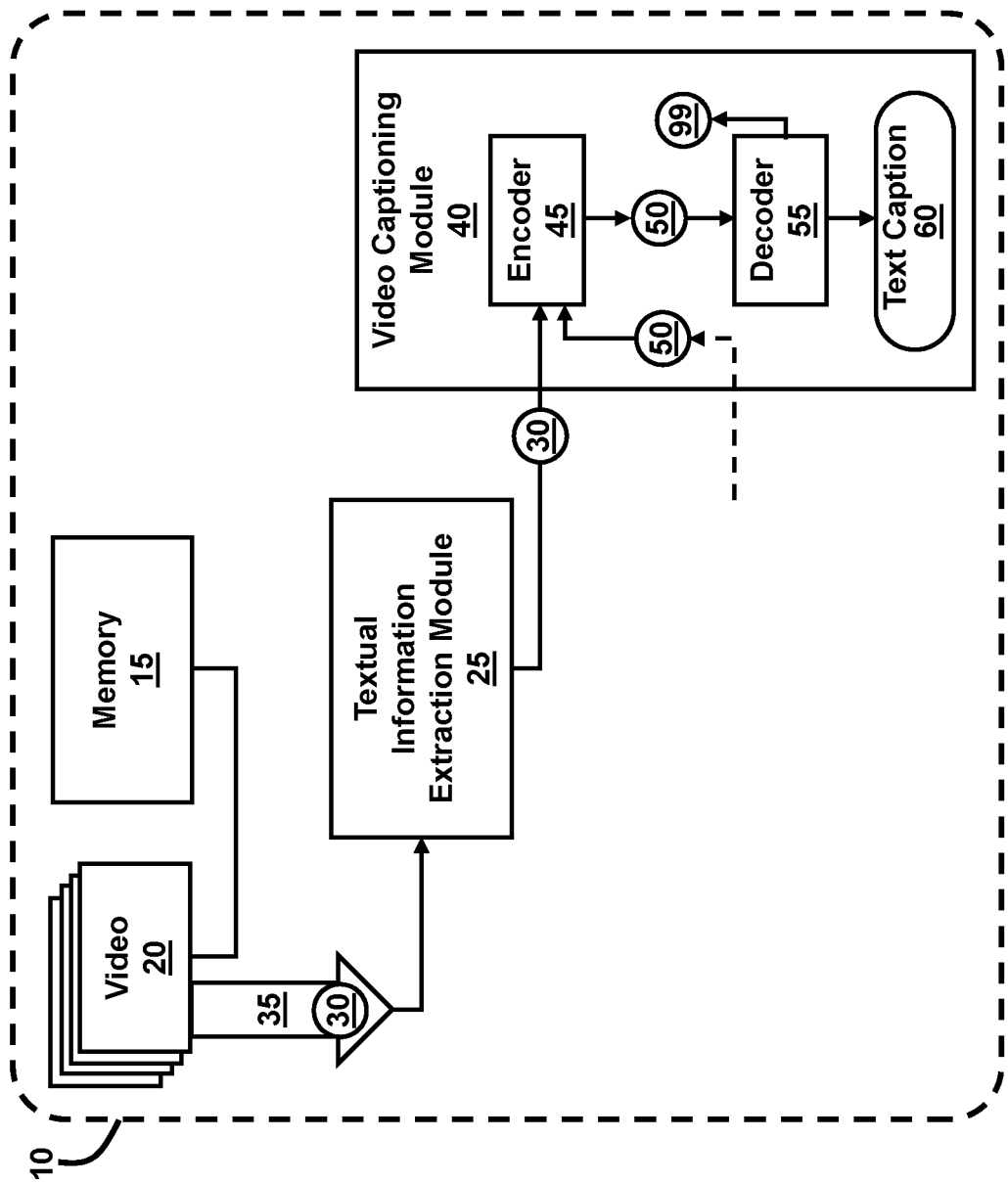

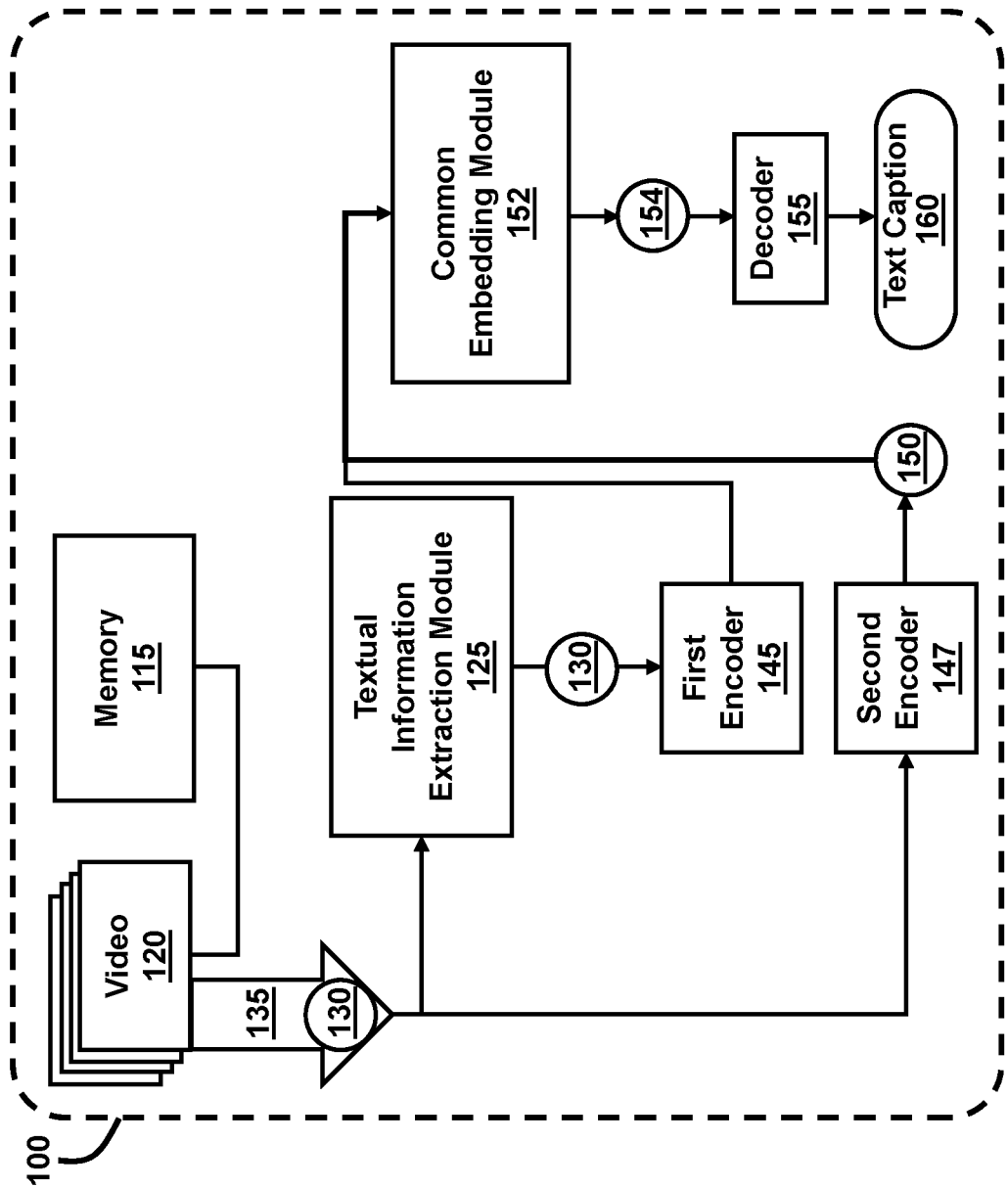

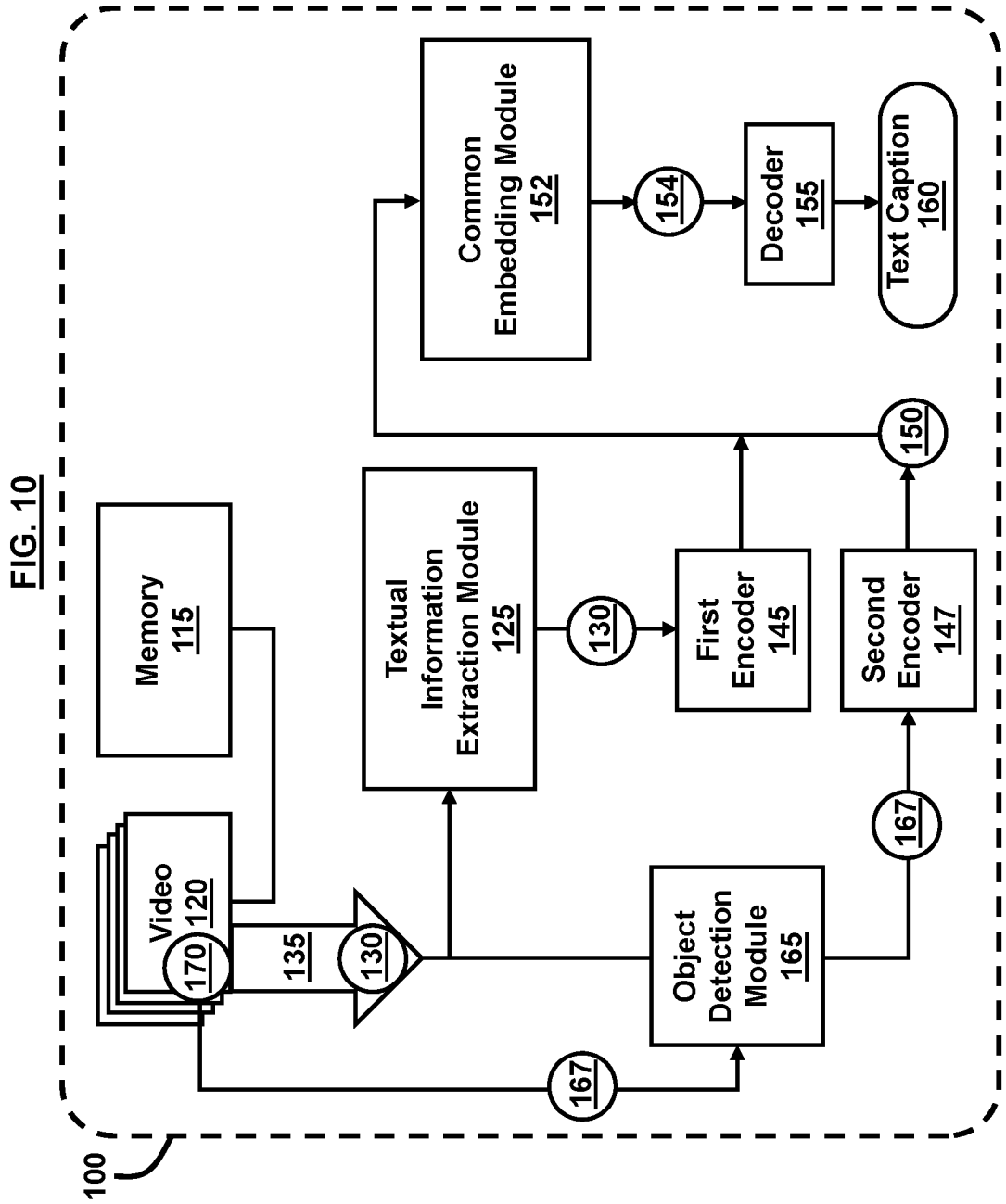

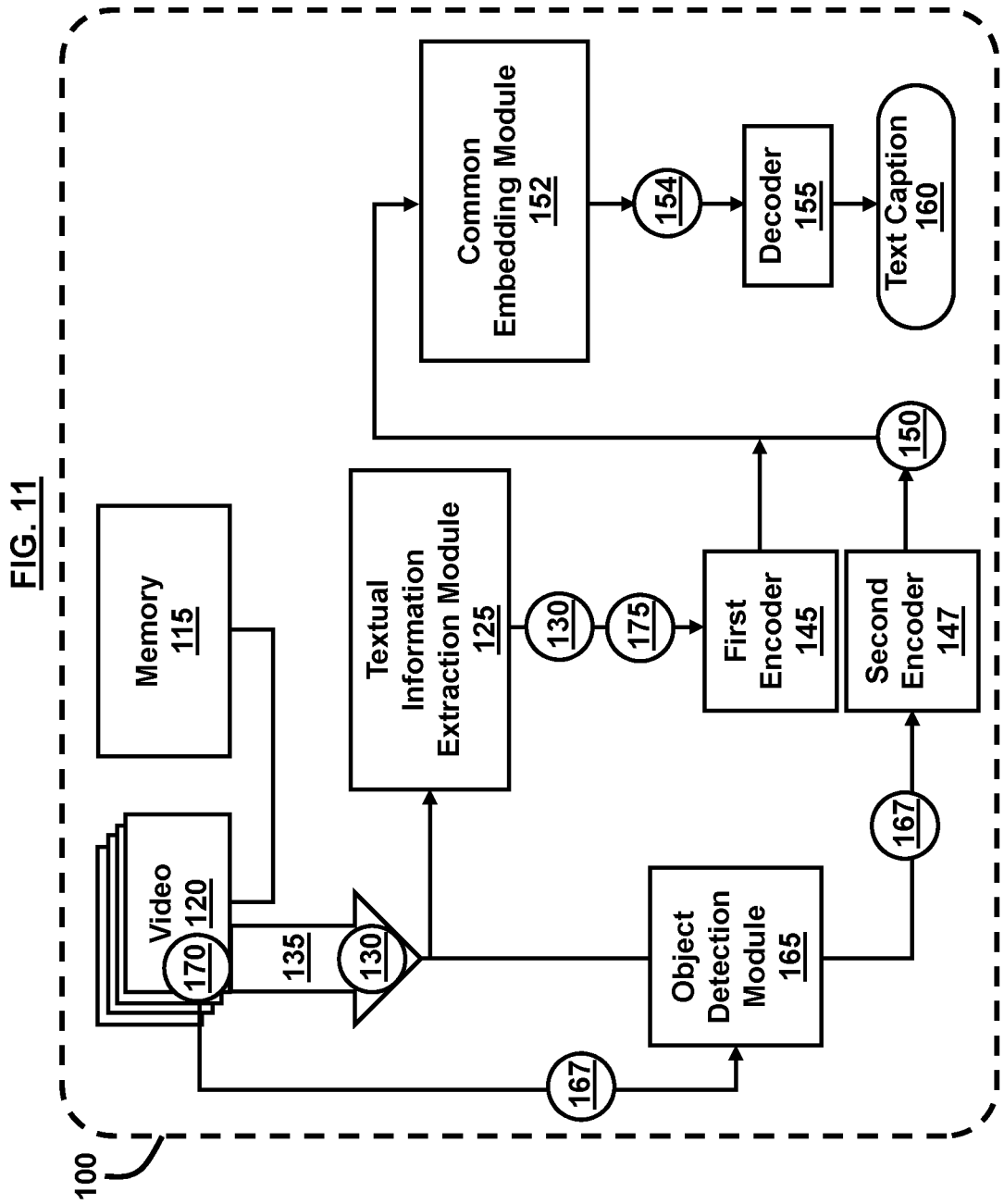

DEEP LEARNING BASED VIDEO INFORMATION EXTRACTION SYSTEM

GOVERNMENT INTEREST

The invention described herein may be manufactured and used by or for the Government of the United States for all government purposes without the payment of any royalty.

BACKGROUND

Field of the Invention

The embodiments herein generally relate video information extraction, and more particularly to machine learning for video systems.

BACKGROUND OF THE INVENTION

A well-known problem in real-world applications of machine learning is that expert labeling of large amounts of data for training a classifier (a function that maps sets of input features or attributes to classes) is prohibitively expensive. Often in practice, only a small amount of labeled data is available and as a result the amount of labeled data is far from adequate. In this case, making an adequate estimation of the model parameters of a classifier is challenging. U.S. Pat. No. 8,572,071, the complete disclosure of which, in its entirety, is herein incorporated by reference, provides a solution for this problem. However, when the data involves video, the problem becomes particularly challenging especially for extracting information from videos. Video information extraction refers to extracting and assigning types to the terms, entities, relations, and events of interest in the video. Although information extraction has been extensively studied for textual data, object detection has been the focus of video analytics.

BRIEF SUMMARY OF THE INVENTION

In view of the foregoing, an embodiment herein provides a video information extraction system comprising a memory to store a video; a textual information extraction module to obtain information about terms, entities, relations, and events from a ground truth caption corresponding to the video; and a video captioning module comprising an encoder (i) to receive the information about the terms, entities, relations, and events from the textual information extraction module, and (ii) to extract video features from the video; and a decoder to generate a text caption based on the extracted video features. The video information extraction system may further comprise an object detection module (i) to obtain regional features corresponding to objects in the video, and (ii) to input the regional features into the encoder and the decoder of the video captioning module to generate the text caption.

The encoder may receive the information about the terms, entities, relations, and events in the form of vectors of higher-order co-occurrence information. The encoder may perform entity resolution on the terms, entities, relations, and events. The encoder may execute a convolutional neural network (CNN). The encoder may receive input from the video in the form of video features extracted through either a pre-trained 2D convolutional neural network or a pre-trained 3D convolutional neural network. The extracted video features may comprise spatio-temporal features. The spatio-temporal features may be derived from the video based on a transfer learning process. The decoder may execute a recurrent neural network (RNN).

Another embodiment provides a video information extraction system comprising a memory to store a video; a textual information extraction module to obtain information about terms, entities, relations, and events from a ground truth caption corresponding to the video; a first encoder to receive the information about the terms, entities, relations, and events from the textual information extraction module; a second encoder to extract video features from the video; a common embedding module to encode the information about the terms, entities, relations, and events and the extracted video features into vectors; and a decoder to generate a text caption based on the vectors.

The video information extraction system may further comprise an object detection module (i) to obtain regional features corresponding to objects in the video, and (ii) to input the regional features into the second encoder. The first encoder may receive the information about the terms, entities, relations, and events in the form of vectors of higher-order co-occurrence information. The first encoder may perform entity resolution on the terms, entities, relations, and events. The first encoder, the second encoder, and the decoder may be trained such that paired video and terms, entities, relations, and events are proximately located in the common embedding module. A generative adversarial learning process may be applied to unpaired data in the common embedding module. The video information extraction system may further comprise a cascaded arrangement of the second encoder and the decoder applied to the video.

Another embodiment provides a video information extraction system comprising a memory to store a video; a video captioning module comprising an encoder to receive the video and ground truth captions corresponding to the video; and a decoder to generate full sentence captions from the video based on the ground truth captions. The video information extraction system further comprises a textual information extraction module to obtain terms, entities, relations, and events from the full sentence captions corresponding to the video. The video information extraction system may further comprise an object detection module (i) to obtain regional features corresponding to objects in the video, and (ii) to input the regional features into the encoder and the decoder of the video captioning module to generate the full sentence captions. The encoder may receive input from the ground truth captions in the form of vectors of higher-order co-occurrence information. The encoder may perform entity resolution on the ground truth captions.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1A is a block diagram illustrating a video information extraction system, according to an embodiment herein;

FIG. 1B is a block diagram illustrating a pre-information extraction technique corresponding to the video information extraction system of FIG. 1A, according to an embodiment herein;

FIG. 2 is a block diagram illustrating the video information extraction system of FIG. 1A with an object detection module, according to an embodiment herein;

FIG. 3 is a block diagram illustrating the video information extraction system of FIG. 1A showing aspects of the encoder, according to an embodiment herein;

FIG. 8 is a block diagram illustrating the video information extraction system of FIG. 1A showing aspects of the decoder, according to an embodiment herein;

FIG. 9A is a block diagram illustrating a video information extraction system, according to a second embodiment herein;

FIG. 10 is a block diagram illustrating the video information extraction system of FIG. 9A with an object detection module, according to an embodiment herein;

FIG. 11 is a block diagram illustrating the video information extraction system of FIG. 9A showing aspects of the first encoder, according to an embodiment herein;

DETAILED DESCRIPTION OF THE INVENTION

Figure 4:
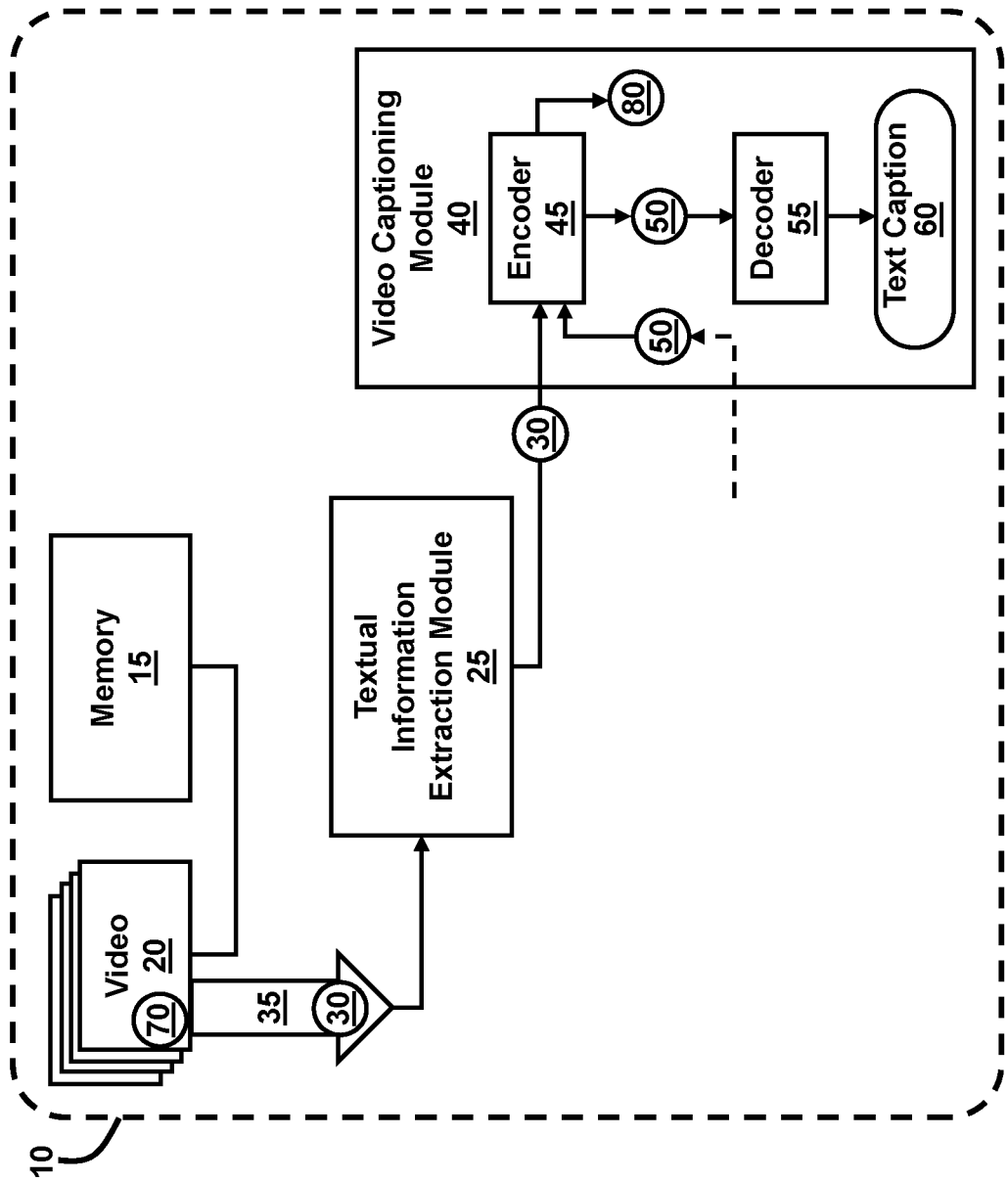
FIG. 4 is a block diagram illustrating the video information extraction system of FIG. 1A showing additional aspects of the encoder, according to an embodiment herein.

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

The embodiments herein provide a deep learning based video information extraction system that is based on ground truth captions for a specific target domain. Video information extraction refers to extracting and assigning types to the terms, entities, relations, and events of interest in the video. This capability can play an important role in video analytics for surveillance cameras in various target domains. For example, it is relevant in homeland security applications such as border protection, as well as related law enforcement, intelligence, security and defense applications. For video entity, relation, and event extraction three embodiments are described. The first embodiment is a pre-IE (pre-information extraction) approach that leverages information extraction capabilities to extract terms, entities, relations, and events from ground truth captions, followed by training a video captioning framework with video features as well as derivatives of the extracted information. The second embodiment is a joint embedding approach that embeds both video features and term/entity/relation/event vectors in a common space. The third embodiment, a post-IE approach, entails training a video captioning framework directly with video features and the ground truth captions such that a descriptive sentence is generated as output. In a post-processing step, information extraction is applied on the output to obtain terms, entities, relations, and events. Referring now to the drawings, and more particularly to FIGS. 1A through 21, where similar reference characters denote corresponding features consistently throughout, there are shown exemplary embodiments. In the drawings, the size and relative sizes of components, layers, and regions, etc. may be exaggerated for clarity.

For video entity, relation and event extraction, three embodiments are described herein. The first is a pre-IE (pre-information extraction) approach that leverages information extraction capabilities to extract terms, entities, relations, and events from ground truth captions, followed by training a video captioning framework with the extracted information. The second example is a joint embedding approach that embeds both video features and term/entity/relation/event vectors in a common space. The third example entails training a video captioning framework directly with the ground truth captions such that a descriptive sentence is generated as output. In a post-processing step, information extraction is applied on the output to obtain terms, entities, relations, and events. This example may be referred to as a post-IE approach. These examples are especially useful in a situation where (a) a small amount of caption data is available as a byproduct of workflows in the target domain, and (b) object class label and localization datasets necessary for object detection for the target domain are not available and expensive to obtain.

The various modules and corresponding components described herein and/or illustrated in the figures may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU or GPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

In other examples, the modules described herein may be programmable modules and may be configured as a computer program product that includes a pre-configured set of instructions, which when performed, can result in actions as stated in conjunction with the methods and techniques described herein. In an example, the pre-configured set of instructions may be stored on a tangible non-transitory computer readable medium or a program storage device. In an example, the tangible non-transitory computer readable medium may be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps. The embodiments herein can include both hardware and software elements. The embodiments that are implemented in software include but are not limited to, firmware, resident software, microcode, etc.

FIG. 1A is a block diagram illustrating a video information extraction system 10 comprising a memory 15 to store a video 20. In some examples, the memory 15 may be Random Access Memory, Read-Only Memory, a cache memory, hard drive storage, flash memory, the cloud, or other type of storage mechanism. Furthermore, the memory 15 may be part of a server computer system or electronic device (not shown) that is remotely linked to the video information extraction system 10 through any of wired and wireless communication, according to an example. The video 20 may be stored as any suitable type of video files such as MPG, MP2, MPEG, MPE, MPV, AVI, WMV, MOV, MKV, VOB, or FLV, among other types of video files and may be presented as video frames. Furthermore, the video 20 may contained embedded images, text, or other graphics.

The video information extraction system 10 comprises a textual information extraction module 25 to obtain information about terms, entities, relations, and events 30 from ground truth captions 35 corresponding to the video 20. The video information extraction system 10 further comprises a video captioning module 40. In an example, the terms, entities, relations, and events 30 may be a unique object or set of objects in the video 20; for example, a specific person(s), place(s), or item(s) in the video 20. The textual information extraction module 25 is configured to automatically extract structured information in the form of terms, entities, relations and events from the unstructured and/or semi-structured machine-readable ground truth captions 35 corresponding to the video 20 through pre-programmed instructions or real-time instructions provided by a user. In an example, the textual information extraction module 25 is a deep learning based textual information extraction module that is executed to obtain the information about the terms, entities, relations, and events 30 from each caption in the ground truth captions 35 corresponding to the video 20. The set of extracted elements are then used as the target to train the video captioning module 40 to extract information from the video 20. In an example, the ground truth captions 35 may be textual captions that are pre-programmed in the textual information extraction module 25 and assigned or linked to the video 20 based on deep learning techniques, or they may be assigned or linked to the video 20 based on user input, which may occur in real time. The information from the textual captions; i.e., the ground truth captions 35, may be extracted using a nominal or named entity recognition (NER) information extraction technique, for example; although other information extraction techniques may be used. For example, the information extraction technique may locate and extract named entity mentions in the ground truth captions 35 of video 20 into pre-defined categories such as person names, organizations, locations, time expressions, quantities, values, percentages, qualifiers, titles, etc. Some example NER techniques which could be used include, without limitations, GATE™, OpenNLP™, and SpaCy™. Moreover, the information extraction technique may be a linguistic grammar-based technique or a mathematical statistical model such as machine learning, which may be trained using training data.

The video captioning module 40 comprises an encoder 45 (i) to receive the information about the terms, entities, relations, and events 30 from the textual information extraction module 25, and (ii) to extract video features 50 from the video 20. In an example, the encoder 45 may comprise a hardware device such as an electronic circuit, integrated circuit chip, or transducer or may comprise a software program to combine the information about the terms, entities, relations, and events 30 with video features 50. For example, the encoder 45 may comprise a video encoder. In an example, the video features 50 may be portions of the video 20 and/or descriptions of the video 20 that are related to the terms, entities, relations, and events 30 corresponding to the video 20. The video information extraction system 10 further comprises a decoder 55 to generate a text caption 60 based on the extracted video features 50. In an example, the decoder 55 may comprise a hardware device such as an electronic circuit, integrated circuit chip, or transducer or may comprise a software program to generate the text caption 60 based on the extracted video features 50. For example, the text caption 60 may be a short summary, synopsis, or title associated with the extracted video features 50 comprised of terms, entities, relations and/or events. In an example, the decoder 55 may comprise a video decoder.

FIG. 1B, with reference to FIG. 1A, is a block diagram illustrating an example in which the information about terms, entities, relations, and events 30 from a ground truth caption 35 is extracted using an information extraction (IE) technique. In this approach, an information extraction capability is first employed to extract terms, entities, relations, and events 30 from the ground truth captions 35 corresponding to the video 20. The extracted information and the video 20 are input for video captioning to extract the video features 50 and to generate the text caption 60 comprised of terms, entities, relations or events composed of type:value pairs.

FIG. 2, with reference to FIGS. 1A and 1B, is a block diagram illustrating that the video information extraction system 10 may further comprise an object detection module 65 (i) to obtain regional features 67 corresponding to objects 70 in the video 20, and (ii) to input the regional features 67 into the decoder 55 by way of the encoder 45 of the video captioning module 40 to generate the text caption 60. In an example, the object detection module 65 may be a pre-trained object detection module such as a one-stage YOLO™ RetinaNet™ or two stage Faster R-CNN, Mask R-CNN, etc., can be used to obtain the regional features 67 corresponding to the objects 70 in the video 20. According to an example, the regional features 67 comprise a partial region of the video 20, and may be defined by a specified pre-programmed region of the video 20 or may be identified by a user in real time. The video 20 may be decomposed into smaller parts to identify the regional features 67. For example, the video 20 may be decomposed based on the duration corresponding to the presence of the specific objects 70 in the video 20 or the location of the objects 70 in the video 20, etc. Furthermore, other decomposition techniques may be utilized to parse the video 20 to identify regional features 67 corresponding to the objects 70 in the video 20. Moreover, the objects 70 may correspond to any person(s), place(s), or item(s) or other type of identifier in the video 20.

FIG. 3, with reference to FIGS. 1A through 2, is a block diagram illustrating that the encoder 45 may receive the information about the terms, entities, relations, and events 30 in the form of vectors 75 of higher-order co-occurrence information. In an example, the vectors 75 may be a graphical representation of the terms, entities, relations, and events 30 from ground truth captions 35 corresponding to the video features 50. As described above, in the video captioning module 40, in an example the information from extracted elements such as terms, entities, relations and/or events composed of type:value pairs is used as input to the decoder 55. This is achieved using a vector approach leveraging higher-order relations between items. Such higher-order relations reflect semantic regularities well, especially when the event space of the items is sparse, and as such improve on existing approaches that leverage first-order co-occurrence relations such as GloVe, Word2Vec, etc. The encoder 45 may perform entity resolution on the terms, entities, relations, and events 30. For example, entity resolution may involve the processes of deduplication, record linkage, and canonicalization. In an example, the Dedupe™ library may be utilized for the entity resolution process.

FIG. 4, with reference to FIGS. 1A through 3, is a block diagram illustrating that the encoder 45 may execute a convolutional neural network (CNN) 80 to extract video features from the video 20. The CNN 80 comprises a deep learning algorithm, which receives an input (such as information about the video regions associated with terms, entities, relations, and events 30 from the textual information extraction module 25), and assigns a rank to various aspects/objects 70 in the video 20 in order to differentiate one object from another. Some example CNNs 80, which may be executed by the encoder 45, include Caffe™, Deeplearning4j™, Dlib™, Microsoft Cognitive Toolkit™, TensorFlow™, Theano™, and Torch™.

Figure 5:
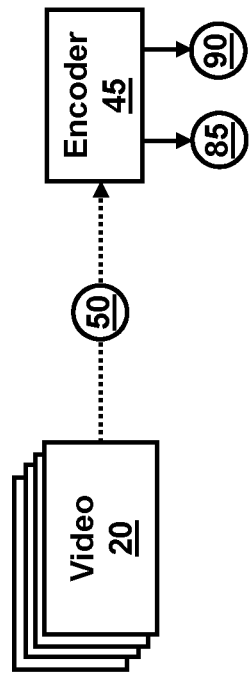
FIG. 5 is a block diagram illustrating the video information extraction system of FIG. 1A showing further aspects of the encoder, according to an embodiment herein.
Figure 7:
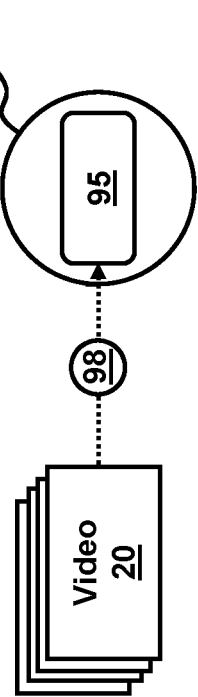
FIG. 7 is a block diagram illustrating the video information extraction system of FIG. 6 showing aspects of the spatio-temporal features, according to an embodiment herein.
Figure 6:
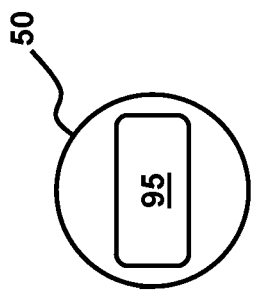
FIG. 6 is a block diagram illustrating the video information extraction system of FIG. 1A showing as aspects of the extracted video features, according to an embodiment herein.

FIG. 5, with reference to FIGS. 1A through 4, is a block diagram illustrating that the encoder 45 may transform input from the video 20 in the form of video features 50 through either a pre-trained 2D convolutional neural network 85 or a pre-trained 3D convolutional neural network 90. FIG. 6, with reference to FIGS. 1A through 5, is a block diagram illustrating that the extracted video features 50 may comprise spatio-temporal features 95 (i.e., occupying space and time features). FIG. 7, with reference to FIGS. 1A through 6, is a block diagram illustrating that the spatio-temporal features 95 may be derived from the video 20 based on a transfer learning process 98. In this regard, the video 20 is converted to the spatio-temporal features 95 through either a pre-trained 2D convolutional neural network (CNN) 85 such as a residual network (ResNet) or VGG, etc., or a pre-trained 3D CNNs 90 such as C3D or I3D, etc. based on the transfer learning process 98. These spatio-temporal features 95 and object level regional features are attended through attention mechanisms during the caption generation process by the decoder 55. Here, the 3D CNNs 90 necessary for modeling temporal features 95 may not be crucial for prediction of entities but may be useful in predicting relations, events/actions, etc., beyond entities. The transfer learning process 98 may permit a machine learning algorithm to improve learning capacities for the video 20 through a previous exposure to a different video and reusing the model developed for the previous video for extracting the video features 50 from the video 20. Some example models used in the transfer learning process 98 may include Oxford™ VGG Model, Google™ Inception Model, and Microsoft™ ResNet Model, etc.

FIG. 8, with reference to FIGS. 1A through 7, is a block diagram illustrating that the decoder 55 may execute a recurrent neural network (RNN) 99. In some examples, the RNN 99 may be long short-term memory (LSTM), gated recurrent unit (GRU), bi-directional, or continuous-time networks, etc. to generate the text caption 60. The RNN 99 may be a type of artificial neural network where connections between nodes form a directed graph along a temporal sequence. The RNN 99 utilizes its memory to process inputs to assist in the modeling of video features 50 for generating the text caption 60.

FIG. 9A is a block diagram illustrating a video information extraction system 100 comprising a memory 115 to store a video 120. In some examples, the memory 115 may be Random Access Memory, Read-Only Memory, a cache memory, hard drive storage, flash memory, the cloud, or other type of storage mechanism. Furthermore, the memory 115 may be part of a server computer system or electronic device (not shown) that is remotely linked to the video information extraction system 100 through any of wired and wireless communication, according to an example. The video 120 may be stored as any suitable type of video files such as MPG, MP2, MPEG, MPE, MPV, AVI, WMV, MOV, MKV, VOB, or FLV, among other types of video files and may be presented as video frames. Furthermore, the video 120 may contained embedded images, text, or other graphics.

The video information extraction system 100 further comprises a textual information extraction module 125 to obtain information about terms, entities, relations, and events 130 from ground truth captions 135 corresponding to the video 120. The video information extraction system 100 further comprises a common embedding module 152. In an example, the terms, entities, relations, and events 130 may be a unique object or set of objects in the video 120; for example, a specific person(s), place(s), or item(s) in the video 120. The textual information extraction module 125 is configured to automatically extract structured information in the form of terms, entities, relations and events from the unstructured and/or semi-structured machine-readable ground truth captions 135 in video 120 through pre-programmed instructions or real-time instructions provided by a user. In an example, the textual information extraction module 125 is a deep learning based textual information extraction module that is executed to obtain the information about the terms, entities, relations, and events 130 from each caption in the ground truth captions 135 corresponding to the video 120. The information about the set of extracted elements is then used as the target to train the common embedding module 152 to link information from the video 120. In an example, the ground truth captions 135 may be textual captions that are pre-programmed in the textual information extraction module 125 and assigned or linked to the video 120 based on deep learning techniques, or they may be assigned or linked to the video 120 based on user input, which may occur in real time. The information from the textual captions; i.e., from the ground truth captions 135, may be extracted using a nominal or named entity recognition (NER) information extraction technique, for example; although other information extraction techniques may be used. For example, an information extraction technique may locate and classify named entity mentions in the ground truth captions 135 of the video 120 into pre-defined categories such as person names, organizations, locations, time expressions, quantities, values, percentages, qualifiers, titles, etc. Some example NER techniques which could be used include, without limitations, GATE™, OpenNLP™, and SpaCy™. Moreover, the information extraction technique may be a linguistic grammar-based technique or a mathematical statistical model such as machine learning, which may be trained using training data.

The video information extraction system 100 further comprises a first encoder 145 to receive the information about the terms, entities, relations, and events 130 from the textual information extraction module 125. A second encoder 147 is provided to extract video features 150 from the video 120. In an example, the first encoder 145 and the second encoder 147 may each comprise a hardware device such as an electronic circuit, integrated circuit chip, or transducer or may comprise a software program to combine the information about the terms, entities, relations, and events 130 with video features 150. For example, the first encoder 145 and the second encoder 147 may each comprise an encoder that operates on textual and video data respectively. In an example, the video features 150 may be portions of the video 120 and/or descriptions of the video 120 that are related to the terms, entities, relations, and events 130 corresponding to objects in the video 120.

The video information extraction system 100 further comprises a common embedding module 152 to encode the information about the terms, entities, relations, and events 130 and the extracted video features 150 into vectors 154. In an example, the vectors 154 may include a graphical representation of the video features 150. The video information extraction system 100 further comprises a decoder 155 to generate a text caption 160 based on the vectors 154. In an example, the decoder 155 may comprise a hardware device such as an electronic circuit, integrated circuit chip, or transducer or may comprise a software program to generate the text caption 160 based on the vectors 154. For example, the text caption 160 may be a short summary, synopsis, or title associated with the extracted video features 150 comprised of terms, entities, relations and/or events. In an example, the decoder 155 may comprise a video decoder.

Figure 9B:
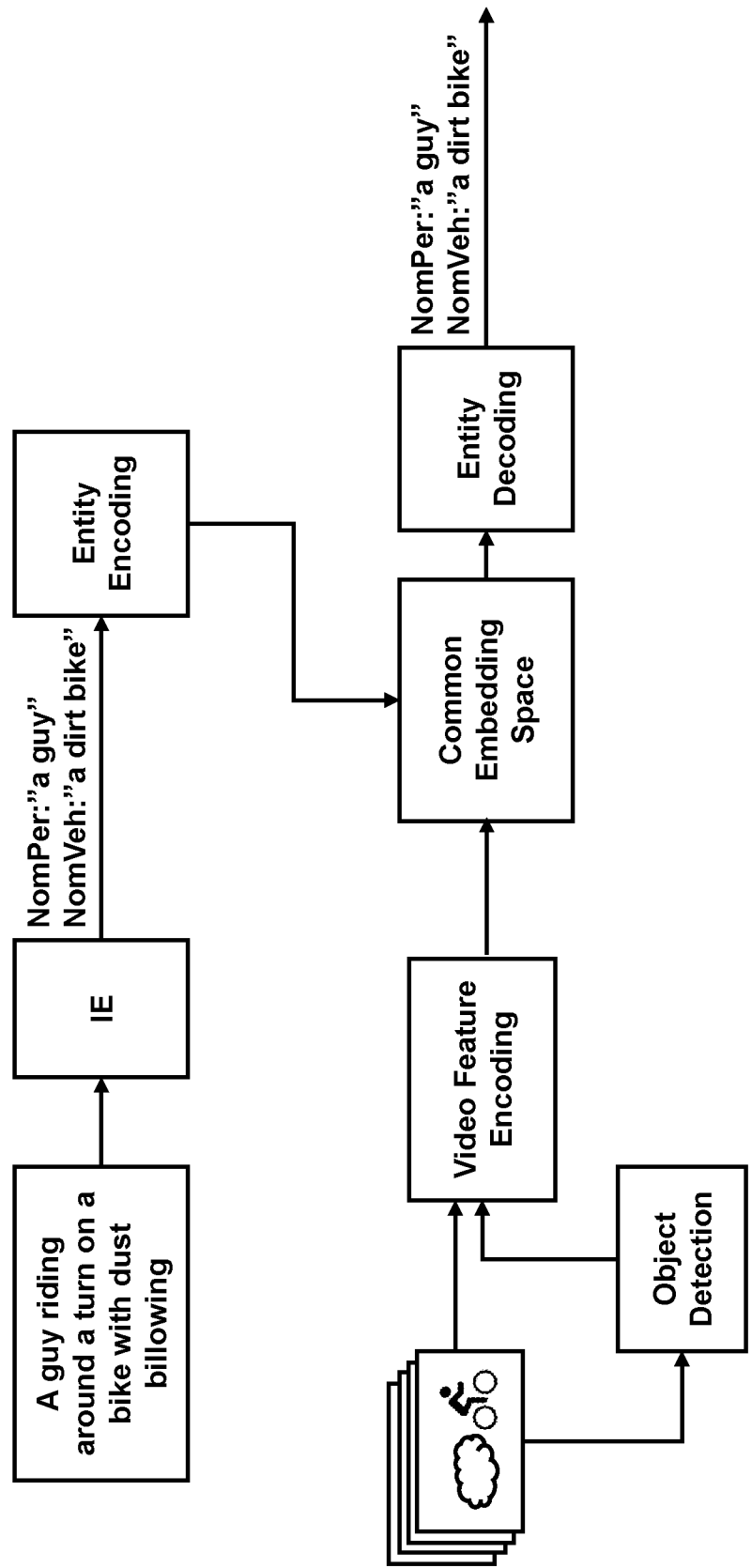
FIG. 9B is a block diagram illustrating a joint embedding technique corresponding to the video information extraction system of FIG. 9A, according to an embodiment herein.

FIG. 9B, with reference to FIG. 9A, illustrates an encoder-decoder framework with two different modalities of data; namely, videos and text, that are mapped to a common space for joint embedding. Without loss of generalization, FIG. 9B. depicts the extraction of entities. The video features 150 of a video 120 and the vectors 154 of the terms, entities, relations, and events 130 are similarly obtained as in the pre-IE approach described above with reference to FIG. 1B. Then, the video features 150 of the video 120 are encoded into vectors in a common space through respective encoders (e.g., first encoder 145 and second encoder 147), and a vector in the common space is reconstructed into entities through the decoder 155. The encoder-decoder system is trained in such a way that paired video and entities are closely located in the common space through respective encoders (e.g., first encoder 145 and second encoder 147), while enabling reconstruction errors, cyclic errors, etc., to be minimized. Generative adversarial learning may be used to leverage unpaired data. During use of the resulting deep learning model, entities can be generated by a cascaded use of a video feature encoder followed by an entity decoder for a given input video 120.

FIG. 10, with reference to FIGS. 9A and 9B, is a block diagram illustrating that the video information extraction system 100 may further comprise an object detection module 165 (i) to obtain regional features 167 corresponding to objects 170 in the video 120, and (ii) to input the regional features 167 into the second encoder 147. In an example, the object detection module 165 may be a pre-trained object detection module such as a one-stage YOLO™, RetinaNet™ or two stage Faster R-CNN, Mask R-CNN, etc., can be used to obtain the regional features 167 corresponding to the objects 170 in the video 120. According to an example, the regional features 167 comprise a partial region of the video 120, and may be defined by a specified pre-programmed region of the video 120 or may be identified by a user in real time. The video 120 may be decomposed into smaller parts to identify the regional features 167. For example, the video 120 may be decomposed based on the duration corresponding to the presence of the specific objects 170 in the video 120 or the location of the objects 170 in the video 120, etc. Furthermore, other decomposition techniques may be utilized to parse the video 120 to identify regional features 167 corresponding to the objects 170 in the video 120. Moreover, the objects 170 may correspond to any person(s), place(s), or item(s) or other type of identifier in the video 120.

FIG. 11, with reference to FIGS. 9A through 10, is a block diagram illustrating that the first encoder 145 may receive the information about the terms, entities, relations, and events 130 in the form of vectors 175 of higher-order co-occurrence information. The vectors 175 may be a graphical representation of the information about the terms, entities, relations, and events 130. In the common embedding module 152, information about extracted elements such as items composed of type:value pairs are mapped to vectors 154 and used as input to the decoder 155. This mapping is achieved using an embedding vector approach leveraging higher-order relations between items in vectors 175. Such higher-order relations reflect semantic regularities well, especially when the event space of the items is sparse, and as such improve on existing approaches that leverage first-order co-occurrence relations such as GloVe, Word2Vec, etc. The first encoder 145 may perform entity resolution on the terms, entities, relations, and events 130. For example, entity resolution may involve the processes of deduplication, record linkage, and canonicalization. In an example, the Dedupe™ library may be utilized for the entity resolution process.

Figure 12:
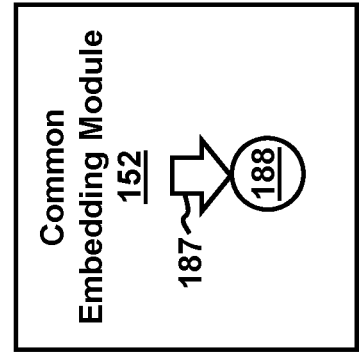
FIG. 12 is a block diagram illustrating the video information extraction system of FIG. 9A showing aspects of the first encoder, the second encoder, and the decoder, according to an embodiment herein.
Figure 13:
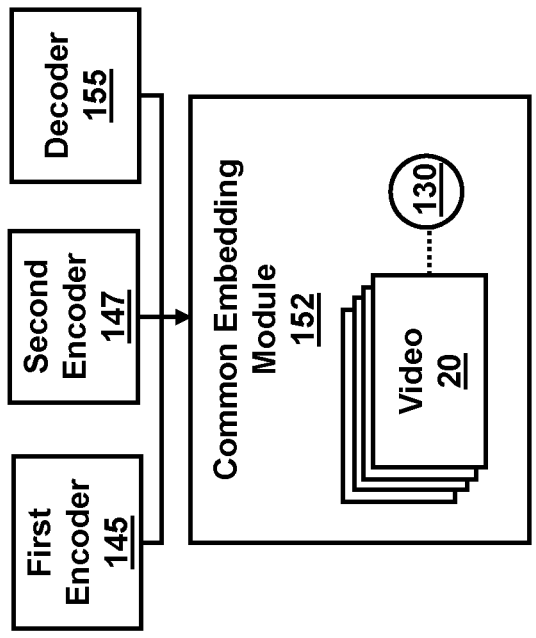
FIG. 13 is a block diagram illustrating the video information extraction system of FIG. 9A showing aspects of the common embedding module, according to an embodiment herein.

FIG. 12, with reference to FIGS. 9A through 11, is a block diagram illustrating that the first encoder 145, the second encoder 147, and the decoder 155 may be trained such that paired video 120 and information about terms, entities, relations, and events 130 are proximately located in the common embedding module 152. This configuration permits reduction in processing time and memory requirements for performing the training. FIG. 13, with reference to FIGS. 9A through 12, is a block diagram illustrating that the common embedding module 152 may reduce reconstruction errors 183 of the vectors 154. For example, the reconstruction errors 183 may be errors between the original data point and its low dimensional reconstruction, and may be used as an anomaly score to detect anomalies in the vectors 154. Moreover, the reconstruction errors 183 may be a mismatch between the values of the vectors 154.

Figure 14:
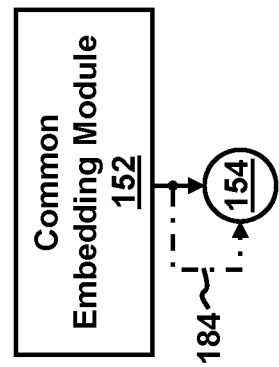
FIG. 14 is a block diagram illustrating the video information extraction system of FIG. 9A showing additional aspects of the common embedding module, according to an embodiment herein.
Figure 15:
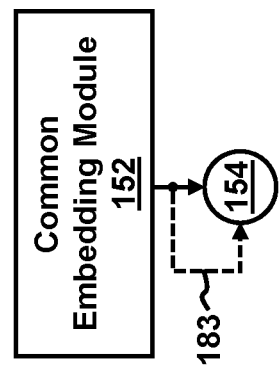
FIG. 15 is a block diagram illustrating the video information extraction system of FIG. 9A showing further aspects of the common embedding module, according to an embodiment herein.
Figure 16:
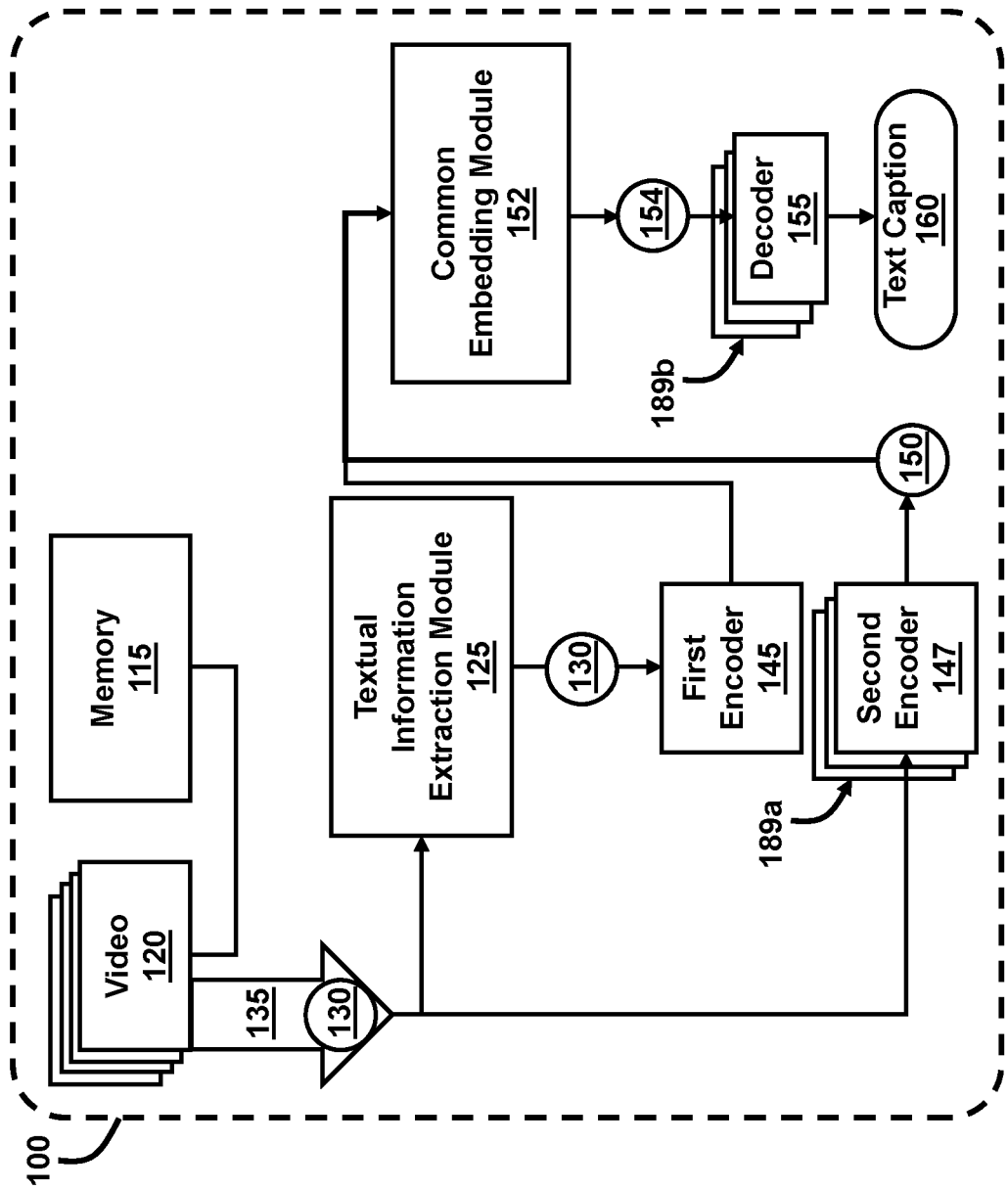
FIG. 16 is a block diagram illustrating the video information extraction system of FIG. 9A showing an arrangement of the second encoder and the decoder, according to an embodiment herein.

FIG. 14, with reference to FIGS. 9A through 13, is a block diagram illustrating that the common embedding module 152 may reduce cyclic errors 184 of the vectors 154. FIG. 15, with reference to FIGS. 9A through 14, is a block diagram illustrating that a generative adversarial learning process 187 may be applied to unpaired data 188 in the common embedding module 152. For example, the generative adversarial learning process 187 may be used to generate new videos based on the unpaired data 188 such that the new videos appear to be authentic to human observers. FIG. 16, with reference to FIGS. 9A through 15, is a block diagram illustrating that the video information extraction system 100 may further comprise a cascaded arrangement 189a, 189b of the second encoder 147 and the decoder 155 applied to the video 120. In an example, the cascaded arrangement 189a, 189b may provide for efficiencies in training the unpaired data 188.

Figure 17A:
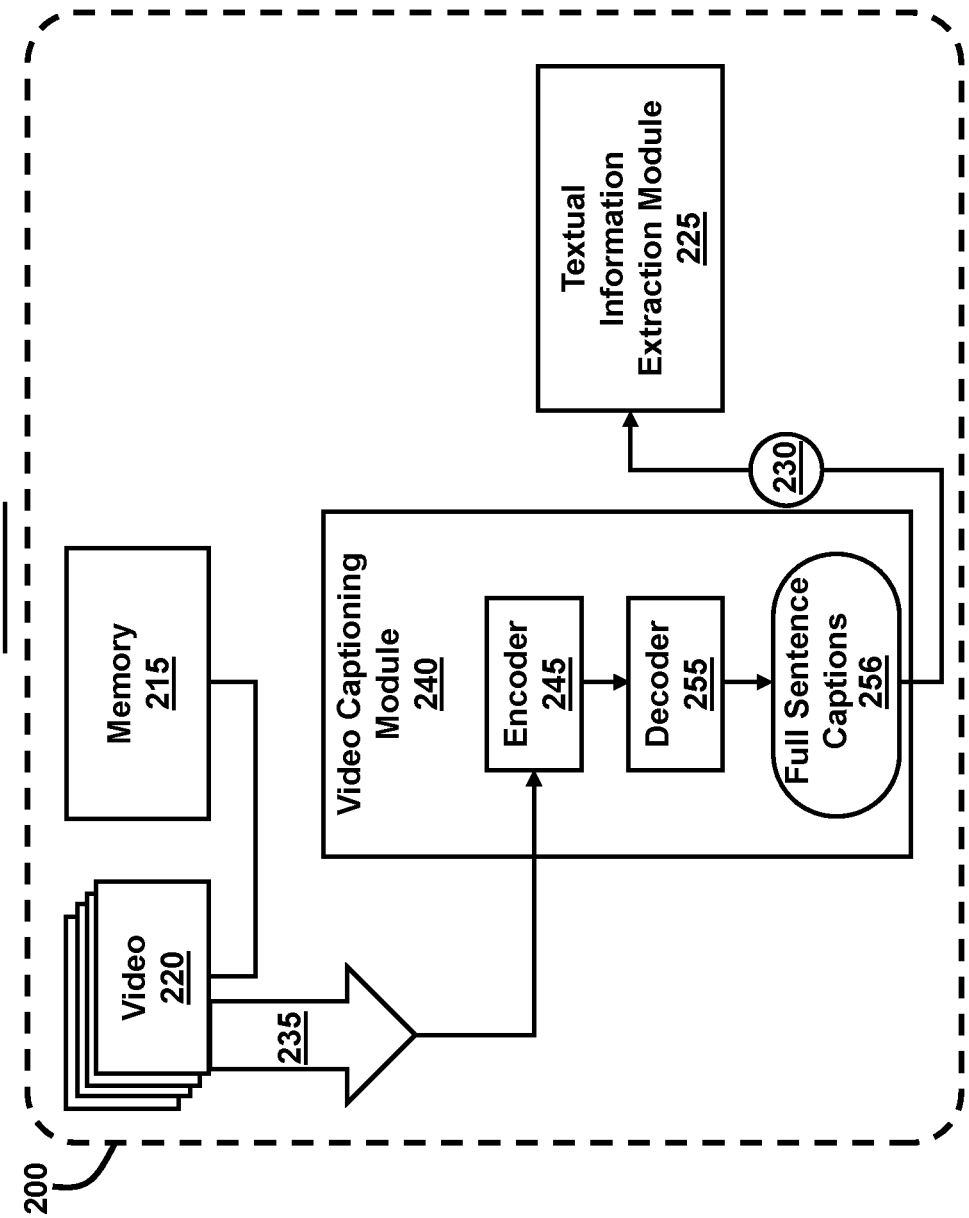
FIG. 17A is a block diagram illustrating a video information extraction system, according to a third embodiment herein.

FIG. 17A is a block diagram illustrating a video information extraction system 200 comprising a memory 215 to store a video 220. In some examples, the memory 215 may be Random Access Memory, Read-Only Memory, a cache memory, hard drive storage, flash memory, the cloud, or other type of storage mechanism. Furthermore, the memory 15 may be part of a server computer system or electronic device (not shown) that is remotely linked to the video information extraction system 200 through any of wired and wireless communication, according to an example. The video 220 may be stored as any suitable type of video files such as MPG, MP2, MPEG, MPE, MPV, AVI, WMV, MOV, MKV, VOB, or FLV, among other types of video files and may be presented as video frames. Furthermore, the video 220 may contained embedded images, text, or other graphics.

The video information extraction system 200 further comprises a video captioning module 240 comprising an encoder 245 to receive the video 220 and ground truth captions 235 corresponding to the video 220. The video information extraction system 200 further comprises a decoder 255 to generate full sentence captions 256 from the video 220 based on the ground truth captions 235. The video information extraction system 200 further comprises a textual information extraction module 225 to obtain terms, entities, relations, and events 230 from the full sentence captions 256 corresponding to the video 220.

In an example, terms, entities, relations, and events 230 may be a unique object or set of objects in the video 220; for example, a specific person(s), place(s), or item(s) in the video 220. A textual information extraction module 225 is configured to automatically extract structured information from the unstructured and/or semi-structured machine-readable full sentence captions 256 corresponding to the video 220 through pre-programmed instructions or real-time instructions provided by a user. In an example, the textual information extraction module 225 is a deep learning based textual information extraction module that is executed to extract the terms, entities, relations, and events 230 from the full sentence captions 256 corresponding to the video 220. In an example, the ground truth captions 235 may be full sentence captions that are assigned or linked to the video 220 based on deep learning techniques, or they may be assigned or linked to the video 220 based on user input, which may occur in real time. The terms, entities, relations and/or events 230 present in the full sentence captions 256 may be extracted using a nominal or named entity recognition (NER) information extraction technique, for example; although other extraction techniques may be used. For example, an information extraction technique may locate and classify named entity mentions in the full sentence captions 256 that correspond to objects in the video 220 into pre-defined categories such as person names, organizations, locations, time expressions, quantities, values, percentages, qualifiers, titles, etc. Some example NER techniques which could be used include, without limitations, GATE™, OpenNLP™, and SpaCy™. Moreover, the information extraction technique may be a linguistic grammar-based technique or a mathematical statistical model such as machine learning, which may be trained using training data.

In an example, the encoder 245 may comprise a hardware device such as an electronic circuit, integrated circuit chip, or transducer or may comprise a software program to encode the full sentence captions 256. For example, the encoder 245 may comprise a video encoder. In an example, the decoder 255 may comprise a hardware device such as an electronic circuit, integrated circuit chip, or transducer or may comprise a software program to generate the full sentence captions 256. For example, the full sentence captions 256 may be a full sentence description associated with objects and/or events in the video 220. In an example, the decoder 255 may comprise a video decoder.

Figure 17B:
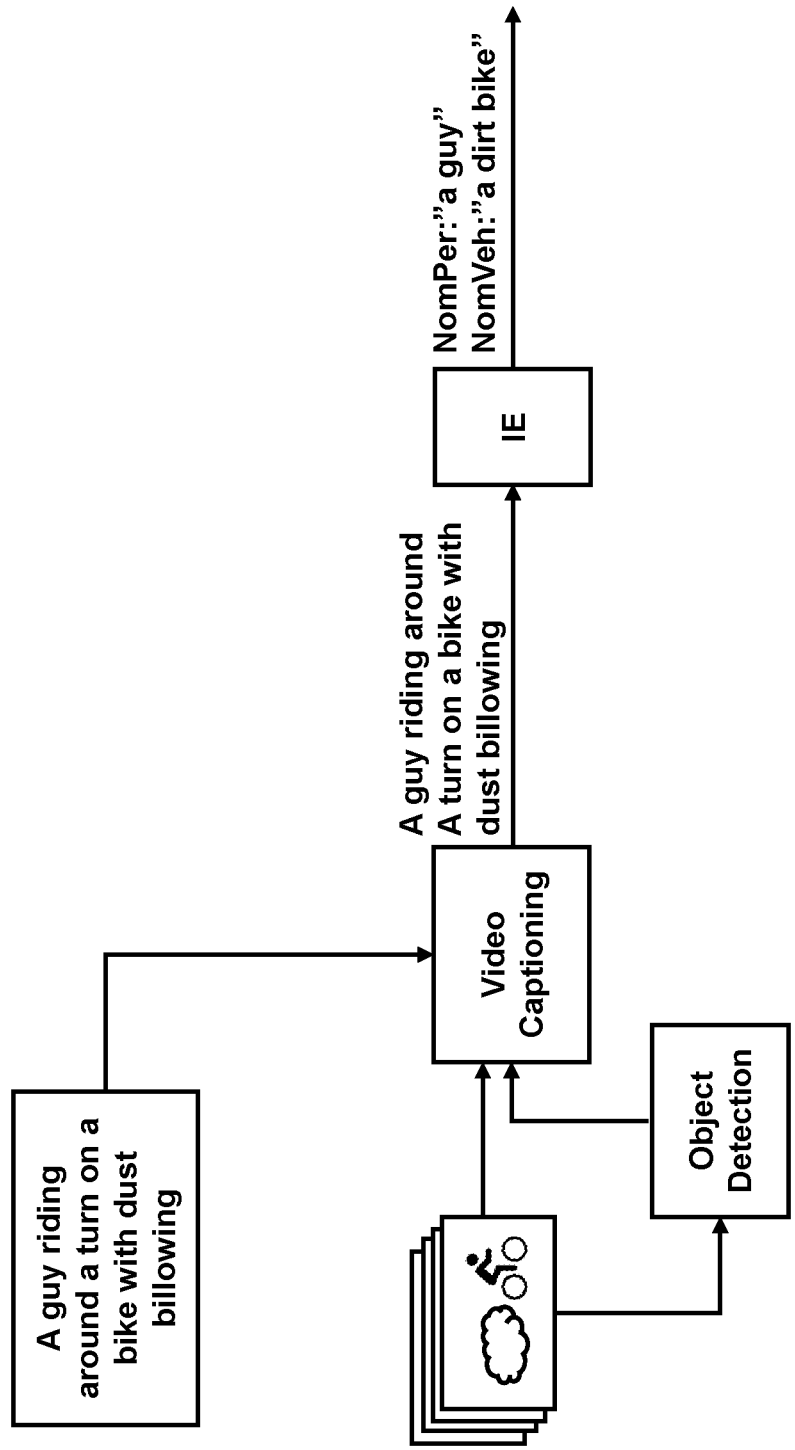
FIG. 17B is a block diagram illustrating a post-information extraction (post-IE) approach corresponding to the video information extraction system of FIG. 17A, according to an embodiment herein.

FIG. 17B, with reference to FIG. 17A, is a block diagram illustrating a post-information extraction (post-IE) technique. In this approach, the video captioning module 240 is trained with ground truth captions 235 to generate full sentence captions 256 and information extraction is applied to the generated full sentence captions 256. The video captioning module 240 comprises a CNN encoder and a RNN decoder similar to the pre-IE approach except that it is trained with ground truth captions 235 to generate full sentence captions 256 describing the content of the video 220 (as opposed to generating terms, entities, relations, and events 230). As noted, information extraction is applied to the generated full sentence captions 256 as a downstream task, and the resulting terms, entities, relations, and events 230 are output.

Figure 18:
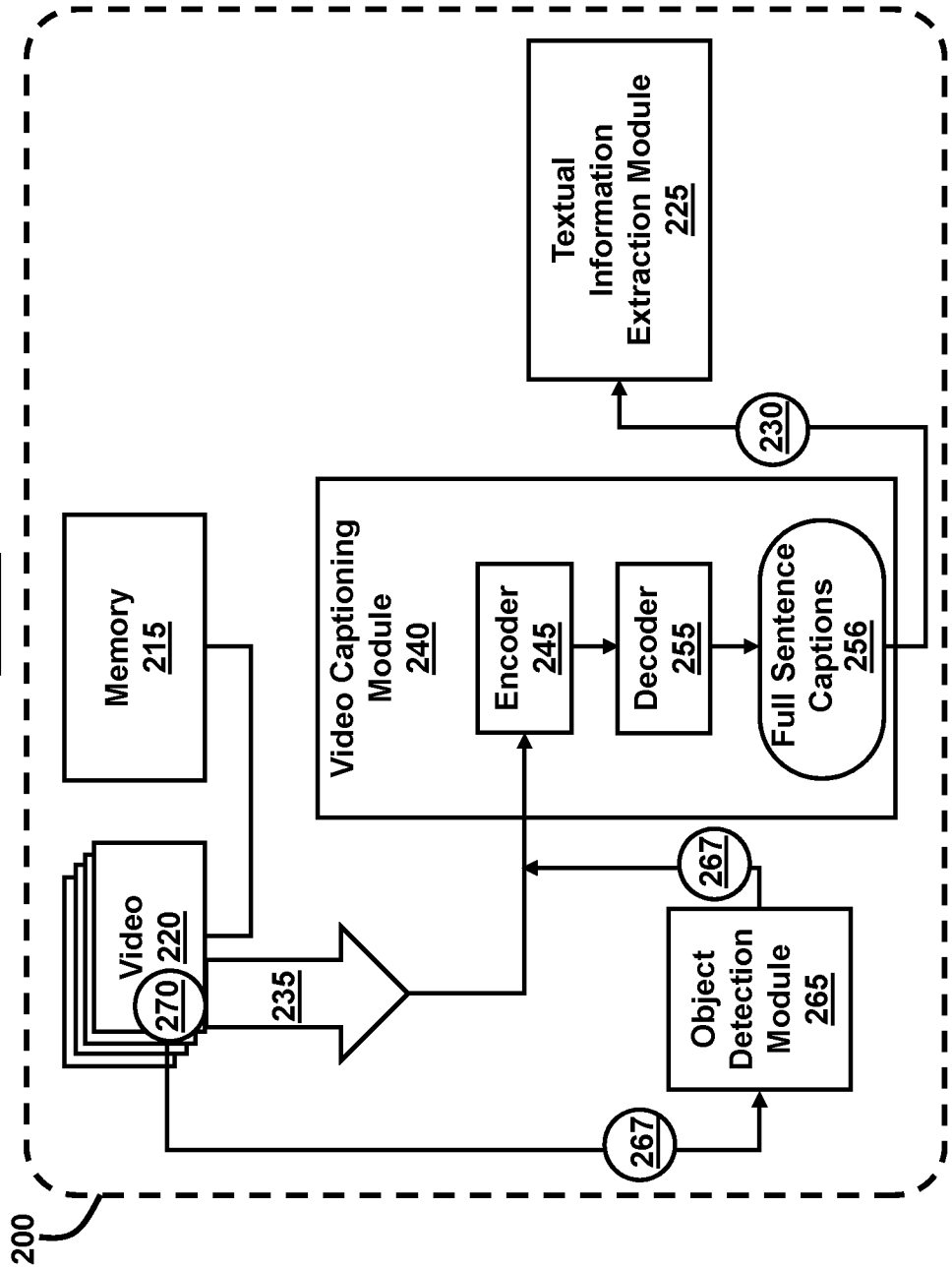
FIG. 18 is a block diagram illustrating the video information extraction system of FIG. 17A with an object detection module, according to an embodiment herein.

FIG. 18, with reference to FIGS. 17A and 17B, is a block diagram illustrating that the video information extraction system 200 may further comprise an object detection module 265 (i) to obtain regional features 267 corresponding to objects 270 in the video 220, and (ii) to input the regional features 267 into the encoder 245 of the video captioning module 240. In an example, the object detection module 265 may be a pre-trained object detection module such as a one-stage YOLO™, RetinaNet™ or two stage Faster R-CNN, Mask R-CNN, etc., can be used to obtain the regional features 267 corresponding to objects in the video 220. According to an example, the regional features 267 comprise a partial region of the video 220, and may be defined by a specified pre-programmed region of the video 220 or may be identified by a user in real time. The video 220 may be decomposed into smaller parts to identify the regional features 267. For example, the video 220 may be decomposed based on the duration corresponding to the presence of the specific objects in the video 220 or the location of the objects 270 in the video 220, etc. Furthermore, other decomposition techniques may be utilized to parse the video 220 to identify regional features 267 corresponding to the objects 270 in the video 220. Moreover, the objects 270 may correspond to any person(s), place(s), or item(s) or other type of identifier in the video 220.

Figure 19:
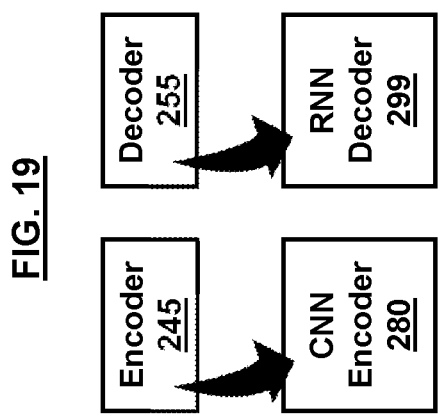
FIG. 19 is a block diagram illustrating the video information extraction system of FIG. 17A showing aspects of the encoder, according to an embodiment herein.

FIG. 19, with reference to FIGS. 17A through 18, is a block diagram illustrating that the encoder 245 may execute a convolutional neural network (CNN) 280, and wherein the decoder 255 may execute a recurrent neural network (RNN) 299. The CNN 280 comprises a deep learning algorithm, which receives an input and assigns a rank to various aspects/objects in the video 220 in order to differentiate one object from another. Some example CNNs 280, which may be executed by the encoder 245, include Caffe™ Deeplearning4j™, Dlib™, Microsoft Cognitive Toolkit™, TensorFlow™, Theano™, and Torch™. In some examples, the RNN 299 may be long short-term memory (LSTM), gated recurrent unit (GRU), bi-directional, or continuous-time networks, etc. to generate the full sentence captions 256. The RNN 299 may be a type of artificial neural network where connections between nodes from a directed graph along a temporal sequence. The RNN 299 utilizes its memory to process inputs to assist in generating the full sentence captions 256.

Figure 20:
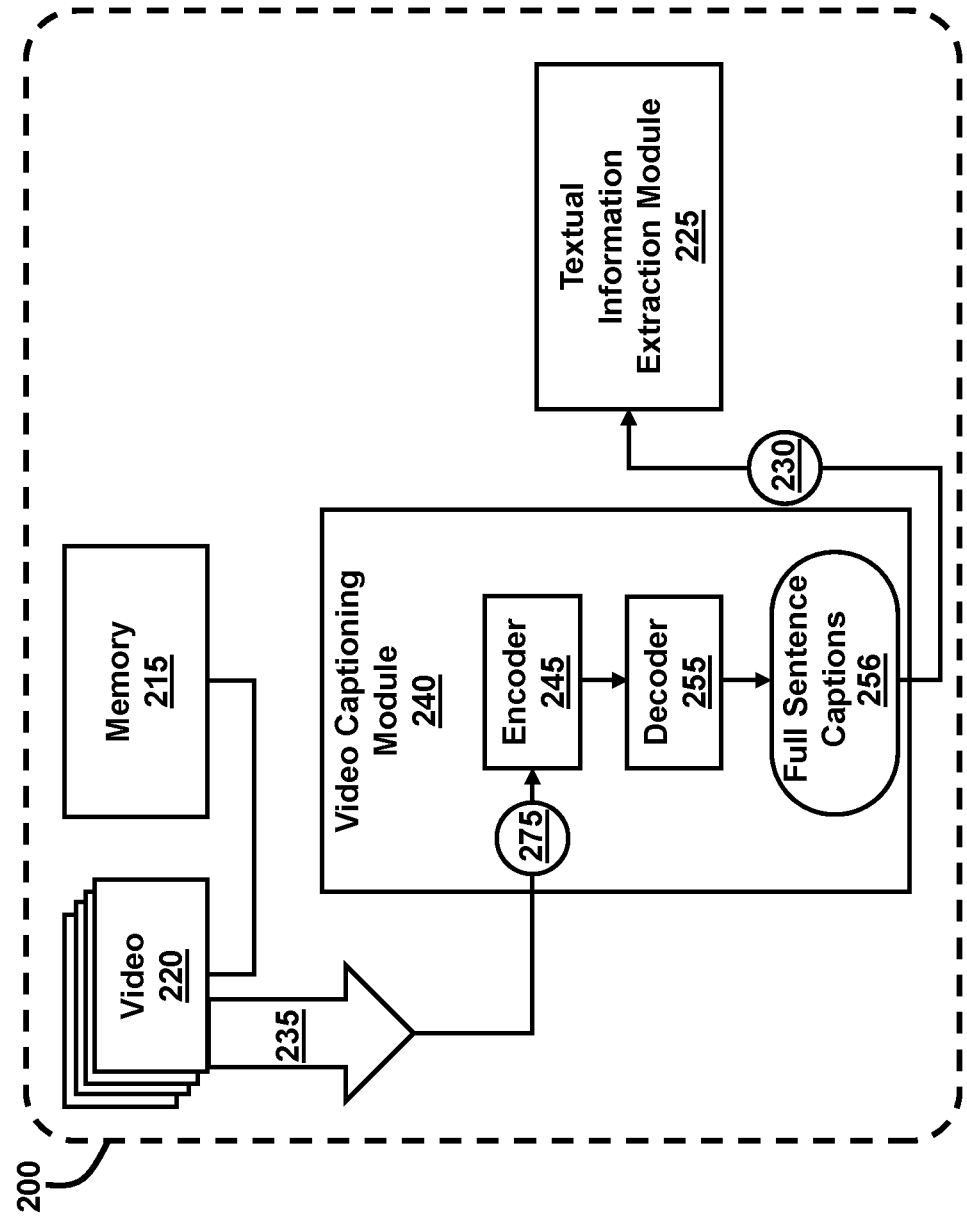
FIG. 20 is a block diagram illustrating the video information extraction system of FIG. 17A showing additional aspects of the encoder, according to an embodiment herein.

FIG. 20, with reference to FIGS. 17A through 19, is a block diagram illustrating that the encoder 245 may receive input from the ground truth captions 235 in the form of vectors 275 of higher-order co-occurrence information. The vectors 275 may be graphical representations of the regional features 267, according to an example. In the video captioning module 240, elements of the ground truth captions are mapped to vectors in a continuous vector space and used as input to the decoder 255. This mapping is achieved using an approach leveraging higher-order relations between elements. Such higher-order relations reflect semantic regularities well, especially when the event space of the items is sparse, and as such improve on existing approaches that leverage first-order co-occurrence relations such as GloVe, Word2Vec, etc. The encoder 245 may perform entity resolution on the ground truth captions 235. For example, entity resolution may involve the processes of deduplication, record linkage, and canonicalization. In an example, the Dedupe™ library may be utilized for the entity resolution process.

In an example, the embodiments herein can provide a computer program product configured to include a pre-configured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The modules provided by the software-enabled embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chip may be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product may be any product that includes integrated circuit chips, ranging from toys and other low-end applications to advanced computer products having a display, a keyboard or other input device, and a central processor.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 21:
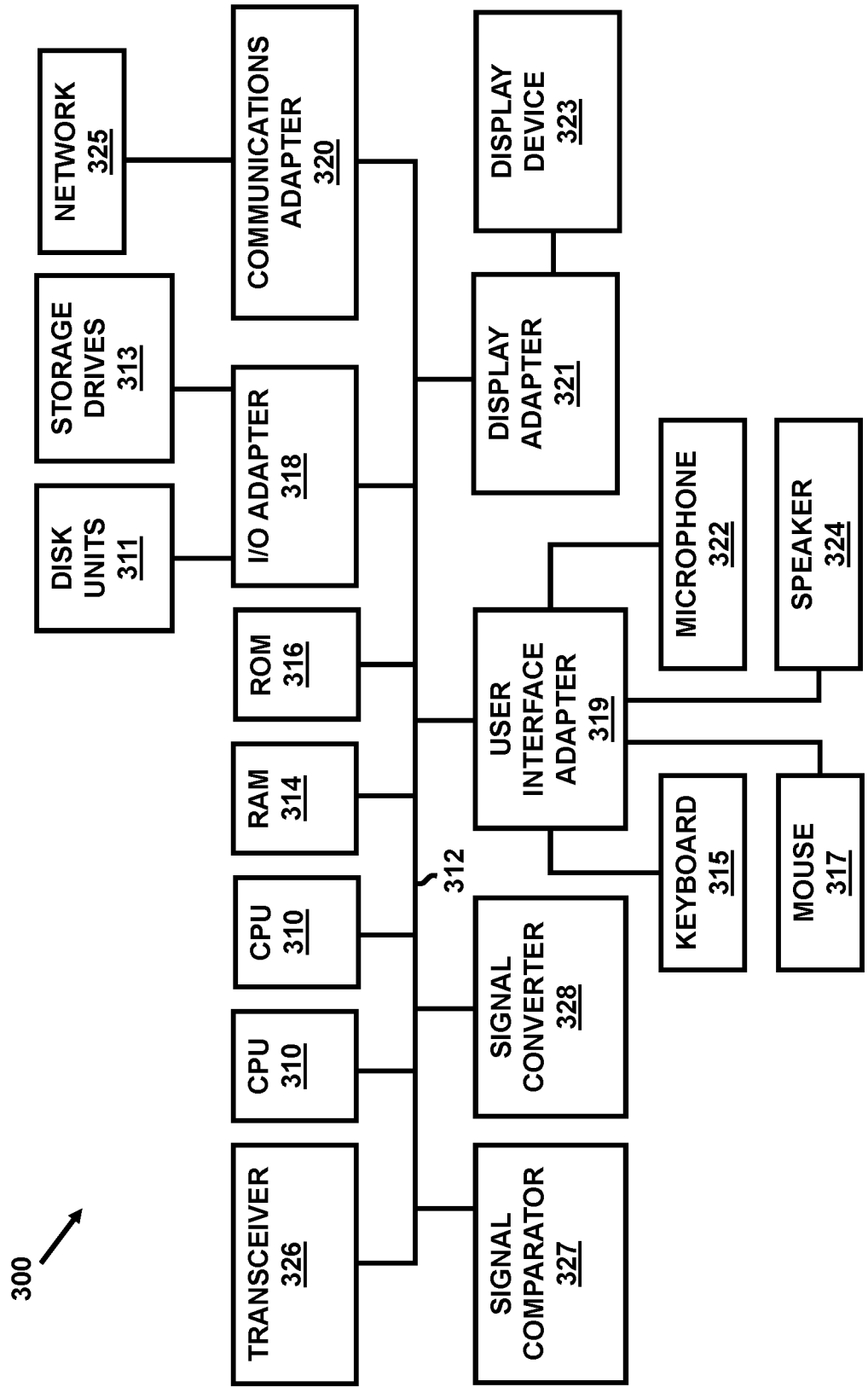
FIG. 21 is a block diagram illustrating a computer system used in accordance with an embodiment herein.

A representative hardware environment for practicing the embodiments herein is depicted in FIG. 21, with reference to FIGS. 1A through 20. This schematic drawing illustrates a hardware configuration of an information handling/computer system 300 in accordance with the embodiments herein. The system 300 comprises at least one processor or central processing unit (CPU) 310. The CPUs 310 are interconnected via system bus 312 to various devices such as a random access memory (RAM) 314, read-only memory (ROM) 316, and an input/output (I/O) adapter 318. The I/O adapter 318 can connect to peripheral devices, such as disk units 311 and tape drives 313, or other program storage devices that are readable by the system. The system 300 can read the inventive instructions on the program storage devices and follow these instructions to execute the methodology of the embodiments herein. The system 300 further includes a user interface adapter 319 that connects a keyboard 315, mouse 317, speaker 324, microphone 322, and/or other user interface devices such as a touch screen device (not shown) to the bus 312 to gather user input. Additionally, a communication adapter 320 connects the bus 312 to a data processing network, and a display adapter 321 connects the bus 312 to a display device 323 which may be embodied as an output device such as a monitor, printer, or transmitter, for example. Further, a transceiver 326, a signal comparator 327, and a signal converter 328 may be connected with the bus 312 for processing, transmission, receipt, comparison, and conversion of electric or electronic signals.

The embodiments herein extend the concept of information extraction to videos by providing a deep learning based video information extraction system that is based on ground truth captions generated by humans for a specific target domain. This capability can play an important role in video analytics for surveillance cameras in various target domains. For example, it is relevant in homeland security applications such as border protection, as well as related law enforcement, intelligence, security and defense applications.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. A video information extraction system comprising:
   a memory to store a video;
   a textual information extraction module to obtain information about entities, relations, and events from a ground truth caption corresponding to the video; and
   a video captioning module comprising:
   an encoder (i) to receive the information about the entities, relations, and events from the textual information extraction module, and (ii) to extract video features from the video; and
   a decoder to generate a text caption based on the extracted video features.

2. The video information extraction system of claim 1, further comprising an object detection module (i) to obtain regional features corresponding to objects in the video, and (ii) to input the regional features into the encoder and the decoder of the video captioning module to generate the text caption.

3. The video information extraction system of claim 1, wherein the encoder receives information about terms, entities, relations, and events in the form of vectors of higher-order co-occurrence information.

4. The video information extraction system of claim 3, wherein the encoder performs entity resolution on the terms, entities, relations, and events.

5. The video information extraction system of claim 1, wherein the encoder executes a convolutional neural network (CNN).

6. The video information extraction system of claim 1, wherein the encoder receives input from the video in the form of video features extracted through either a pre-trained 2D convolutional neural network or a pre-trained 3D convolutional neural network.

7. The video information extraction system of claim 1, wherein the extracted video features include spatio-temporal features.

8. The video information extraction system of claim 7, wherein spatio-temporal features are derived from the video based on a transfer learning process.

9. The video information extraction system of claim 1, wherein the decoder executes a recurrent neural network (RNN).

10. A video information extraction system comprising:
a memory to store a video;
a textual information extraction module to obtain information about entities, relations, and events from a ground truth caption corresponding to the video;
a first encoder to receive the information about the entities, relations, and events from the textual information extraction module;
a second encoder to extract video features from the video;
a common embedding module to encode the information about the entities, relations, and events and the extracted video features into vectors; and
a decoder to generate a text caption based on the vectors.

11. The video information extraction system of claim 10, further comprising an object detection module (i) to obtain regional features corresponding to objects in the video, and (ii) to input the regional features into the second encoder.

12. The video information extraction system of claim 10, wherein the first encoder receives information about terms, entities, relations, and events in the form of vectors of higher-order co-occurrence information.

13. The video information extraction system of claim of claim 12, wherein the first encoder performs entity resolution on the terms, entities, relations, and events.

14. The video information extraction system of claim 10, wherein the first encoder, the second encoder, and the decoder are trained such that paired video objects and entities, relations and events are proximately located in the common embedding module.

15. The video information extraction system of claim 10, wherein a generative adversarial learning process is applied to unpaired data in the common embedding module.

16. The video information extraction system of claim 10, comprising a cascaded arrangement of the second encoder and the decoder applied to the video.

17. A video information extraction system comprising:
a memory to store a video;
a video captioning module comprising:
an encoder to receive the video and ground truth captions corresponding to the video; and
a decoder to generate full sentence captions from the video based on the ground truth captions;
a textual information extraction module to obtain entities, relations, and events from the full sentence captions corresponding to the video.

18. The video information extraction system of claim 17, further comprising an object detection module (i) to obtain regional features corresponding to objects in the video, and (ii) to input the regional features into the encoder and the decoder of the video captioning module to generate the full sentence captions.

19. The video information extraction system of claim 17, wherein the encoder receives input from the ground truth captions in the form of vectors of higher-order co-occurrence information.

20. The video information extraction system of claim 19, wherein the encoder performs entity resolution on the ground truth captions.

* * * * *